March 17, 1942.  V. HRDINA  2,276,399

METHOD OF MAKING HOLLOW GLASSWARE

Filed Dec. 14, 1938

Inventor
Vaclav Hrdina
By [signature]
Attorney

Patented Mar. 17, 1942

2,276,399

UNITED STATES PATENT OFFICE 2,276,399

METHOD OF MAKING HOLLOW GLASSWARE

Václav Hrdina, Chlum, near Trebon, Czechoslovakia

Application December 14, 1938, Serial No. 245,558
In Czechoslovakia April 23, 1938

7 Claims. (Cl. 49—80)

This invention relates to a process for manufacturing hollow glass-ware.

Heretofore hollow glass-ware, having a hollow part, a base and a solid stem joining the hollow part and a base, has been manufactured by processes involving several distinct operations. In one process of this nature, the hollow part is first of all blown in a mould, then there is applied a piece of glass from which the stem is drawn, and finally the base, which has been manufactured separately, is joined to the stem. Thus, three operations are necessary for the manufacture of each such article. In another process the stem is moulded first, the hollow part is then blown and thereafter the base is joined on. Three distinct operations are therefore necessary here also. Then, there is the process consisting of blowing the hollow part together with a piece of glass for the stem, heating this piece of glass, drawing the stem and then joining the base to the end thereof. Evidently, in all these processes at least three distinct operations are necessary, making the processes expensive and protracted. Moreover it is well known that parts which have been joined often come apart, and it has been found frequently that parts joined together do not have the same strength at the joints as articles made in one piece.

Further, the process of manufacture under which the stem is drawn by hand from the glass of the pipe and the part so formed is brought to the mould and blown to produce the hollow part and then joined to the base, is protracted and requires great skill on the part of the worker. The stems formed in this manner are not uniform, i. e. they are not all the same length and thickness, and often break. Only stems of circular cross-section can be manufactured in this way, and they are generally of poor quality of merchandise.

It is an object of the present invention to overcome the disadvantages referred to and to provide a process for manufacturing hollow glass vessels in which the number of operations is materially reduced and at the same time articles of high quality will be produced.

Figure 1:
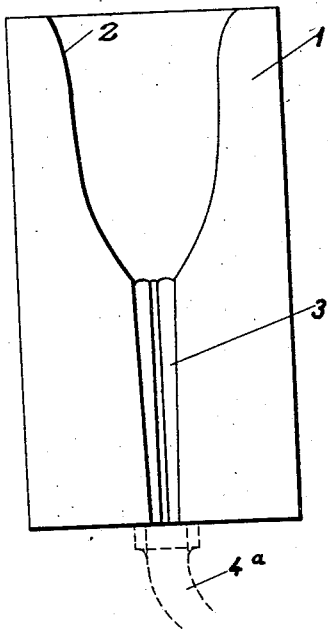
Figure 2:
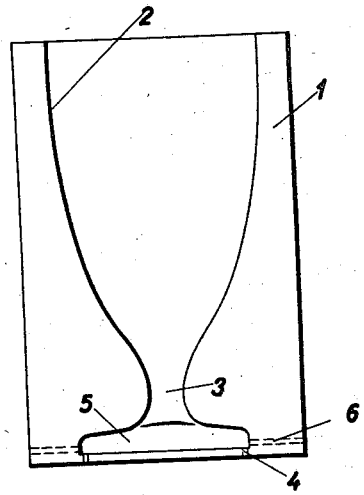
Figure 3:
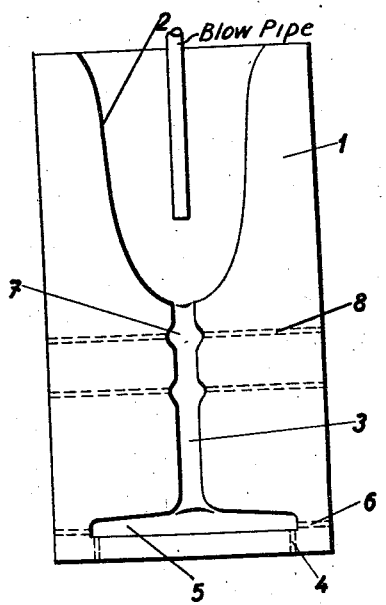

Examples of the invention will now be described with reference to the accompanying diagrammatic drawing, whereon:

Figs. 1–3 show a section of three different moulds for preliminarily-moulding wine-glass-like vessels.

Referring to the drawing:

With the mould having its sections of the construction shown in Fig. 1, glass is transported on the end of the blow pipe from the source of glass supply and inserted into the flared part 2 of the mould 1 and by producing suction-pressure, preferably at the base end of the mold e. g. by means of a tube 4a, connected to the mold in any suitable manner, in the parts 3 of the mould, the solid stem is sucked from a portion of the glass thus deposited into the mould. After this step, the gob being still unseparated from the pipe, the upper hollow part of the article is moulded by a combined blowing and moulding operation in a second mould.

More advantageously after conveying the glass by the pipe into the mould, the upper hollow part of the article is preliminarily-moulded by blowing at the same time as the solid stem is sucked, so that blowing into the glass in the mould is performed at one end of the mould by means of the pipe and a suction is applied simultaneously at the other end of the mould. This suction can naturally be controlled as required during the operation. The partly formed intermediate product, still unseparated from the pipe, is blown in a further mould to the exact shape desired.

The vessel is completed by applying the base by fusion in known manner.

According to the invention, however, hollow vessels with an integral base can even be formed in one operation, viz., by performing, while blowing the hollow part, a sucking operation to form the base portion 5, or the stem 3 together with the base 5, as is shown in Figs. 2 and 3 of the drawing. In such cases, slits or ducts 4, 6 are provided at the circumference of the base, suction being applied to these ducts in any suitable manner. The position of said slits may be chosen with regard to the most favourable effect on the glass in accordance with the desired shape of the base or stem.

As will be obvious, various kinds of modelled stems can be made in a similar manner, for example stems with various ridges 7 as shown in Fig. 3, or cornered or figured stems or the like. This can be effected advantageously by providing sucking ducts 8 at such parts of the stem as are to be widened, to obtain the exact shape desired, and suction may be applied to these ducts in any desired or suitable manner. The term "stem" used herein and in the claims is therefore to be taken as applying to all possible shapes of the support for the actual hollow part, e. g. it includes globular-shapes.

In the above processes also, the partly formed article is completed in a second mould.

Since, by the process in accordance with the invention as described above, the hollow part with the stem can be formed from one piece of glass, i. e. from an undivided gob and if required can be formed with the base also as illustrated with reference to Figs. 2 and 3, the vessels so manufactured are far more able to withstand breakage than are vessels consisting of separate parts joined together as heretofore.

Another great advantage of the new process is that, as opposed to the previous processes, other conditions being equal, it permits generally appreciably improving the quality of the products and the stems will be uniform throughout.

The invention is not limited to the constructions described and illustrated, but can be applied in numerous modifications to all kinds of glass ware, in which there exist manufacturing difficulties such as those referred to, without exceeding the scope of the invention.

I claim:

1. In the process for the manufacture of hollow glass vessels comprising a hollow part and a stem joined to the hollow part; and wherein glass to be formed into a vessel is gathered on a blow pipe; moving the blow pipe to deposit the gathered glass in a mould and performing blowing and suction operations to mould the stem of the vessel from a portion of the glass delivered to the mould, the blowing and sucking operations being performed while maintaining the delivered glass unseparated from the blow pipe so that the glass can be worked to its final shape by a further blowing operation.

2. In the process for the manufacture of hollow glass vessels comprising a hollow part, a base, and a solid stem joining the hollow part to the base and wherein glass to be formed into a vessel is gathered on a blow pipe; the steps of moving the blow pipe to deposit the gathered glass in a mold, preliminarily-molding the hollow part of the vessel from a portion of the glass in the mould by blowing into the mould, simultaneously moulding the stem and base of the vessel from the remaining portion of the glass in the mould by applying suction from the mould, the sucking and blowing being performed while maintaining the gathered glass attached to the blow pipe, and subsequently finally-moulding the hollow part of the vessel by a combined blowing and moulding operation on the glass.

3. The process according to claim 2, wherein the blowing into the mould is performed at one end of the mould and the simultaneous application of suction is performed at the opposite end thereof.

4. In the process for the manufacture of hollow glass vessels comprising a hollow part and a stem joined to the hollow part; and wherein glass to be formed into a vessel is gathered on a blow pipe, depositing the gathered glass in a mould; performing a blowing operation in the mould at one end thereof to preliminarily-mould the hollow part of the vessel from a portion of the gathered glass, performing a sucking operation from the opposite end of the mould to mould the stem of the vessel from a remaining portion of the gathered glass, and performing a subsequent combined blowing and moulding operation on the gathered glass to finally-mould the hollow part of the vessel, the aforesaid operations being performed while maintaining the gathered glass attached to the blow pipe.

5. In the process for the manufacture of hollow glass vessels comprising a hollow part, a base and a stem joining the hollow part to the base and wherein glass to be formed into a vessel is gathered on a blow pipe, from a source of glass; the steps of moving the blow pipe to deposit the gathered glass in a mould, forming the stem and the base of the vessel by moulding under suction a portion of the gathered glass, the suction being applied in a direction substantially parallel to the axis of the stem, and of forming the hollow part of the vessel by a subsequent combined blowing and moulding operation on the gathered glass, both moulding operations being performed while maintaining the gathered glass attached to the blow pipe.

6. A process for the manufacture of hollow glass-vessels comprising a hollow body part and a solid stem joined to the body part, which consists of gathering a gob of molten glass on the end of a conventional blow-pipe, depositing the gob in the cavity of a mould, the cavity conforming to the form of the vessel to be produced and comprising a body part and a stem part, blowing a portion of the gob against the walls of the body part of the cavity to preliminarily-mould the body part of the vessel, exhausting the stem-part of the cavity so as to expand a portion of the gob into said stem-part of the cavity and thereby mould the stem-part of the vessel, while maintaining the gob on the end of the blow-pipe transferring the gob to a finishing mould, and finally moulding the hollow part of the vessel by a blowing operation in said finishing mould.

7. A process for the manufacture of a hollow glass vessel, including a stem, characterized by the fact that the glass which is to form the vessel together with its stem is conveyed to a mold by a blow pipe and preliminarily shaped in said mold by blowing and sucking operations, without separating the glass from said blow pipe, the stem of the vessel being shaped by said sucking operation, which is performed simultaneously with the said blowing operation, which preliminarily shapes the hollow part of the vessel.

VÁCLAV HRDINA.